United States Patent [19]

Tsuno et al.

[11] Patent Number: 4,719,074
[45] Date of Patent: * Jan. 12, 1988

[54] METAL-CERAMIC COMPOSITE ARTICLE AND A METHOD OF PRODUCING THE SAME

[75] Inventors: Nobuo Tsuno, Kasugai; Minoru Matsui, Nagoya, both of Japan

[73] Assignee: NGK Insulators, Ltd., Nagoya, Japan

[*] Notice: The portion of the term of this patent subsequent to Sep. 1, 2004 has been disclaimed.

[21] Appl. No.: 700,104

[22] Filed: Feb. 11, 1985

[30] Foreign Application Priority Data

Mar. 29, 1984 [JP] Japan ............................. 59-59524
Aug. 15, 1984 [JP] Japan ............................. 59-169254

[51] Int. Cl.⁴ .............................................. B22F 7/02
[52] U.S. Cl. ........................................... 419/5; 419/10;
419/13; 419/17; 428/547; 148/127; 29/23.5;
416/241 B; 123/193 R
[58] Field of Search ................... 419/5, 8, 10, 13, 14,
419/17, 57; 148/127; 156/293, 294; 29/23.5,
156.6; 123/193 R; 428/469, 627, 547; 416/241,
241 B; 417/407

[56] References Cited

U.S. PATENT DOCUMENTS

| 1,794,782 | 3/1931 | Lord . |
| 1,940,870 | 12/1933 | Litton . |
| 2,297,508 | 9/1942 | Schutte . |
| 2,891,525 | 6/1959 | Moore . |
| 2,933,386 | 4/1960 | Pessel ............................. 419/45 |
| 3,321,565 | 5/1967 | Peterson et al. . |
| 3,604,819 | 9/1971 | Krahe et al. . |
| 3,666,302 | 5/1972 | Kellett . |
| 3,801,226 | 4/1974 | Bevan et al. . |
| 4,014,968 | 3/1977 | Simon . |
| 4,123,199 | 10/1978 | Shimizu et al. . |
| 4,176,519 | 12/1979 | Kronogard . |
| 4,214,906 | 7/1980 | Langer et al. .................. 75/208 R |
| 4,256,441 | 3/1981 | Arora . |
| 4,270,380 | 6/1981 | Gulati et al. . |
| 4,279,576 | 7/1981 | Okano et al. .................... 417/407 |
| 4,281,941 | 8/1981 | Rottenkolber . |
| 4,325,647 | 4/1982 | Maier et al. . |
| 4,341,826 | 7/1982 | Prewo et al. ...................... 428/35 |
| 4,404,935 | 9/1983 | Kraft . |
| 4,424,003 | 1/1984 | Brobeck . |
| 4,479,293 | 10/1984 | Miller et al. ................. 29/156.8 R |
| 4,479,735 | 10/1984 | Thompson et al. . |
| 4,492,737 | 1/1985 | Connolly ........................ 428/552 |
| 4,495,684 | 1/1985 | Sander et al. . |
| 4,503,009 | 3/1985 | Asaka ................................ 419/6 |
| 4,518,315 | 5/1985 | Kruger . |
| 4,531,269 | 7/1985 | LaBouff . |
| 4,548,786 | 10/1985 | Yohe .................................. 419/29 |
| 4,614,453 | 9/1986 | Tsuno et al. ....................... 403/30 |

FOREIGN PATENT DOCUMENTS

| 95540 | 12/1983 | European Pat. Off. . |
| 142334 | 5/1985 | European Pat. Off. . |
| 139406 | 5/1985 | European Pat. Off. . |
| 2845716 | 4/1980 | Fed. Rep. of Germany . |
| 58-214018 | 12/1983 | Japan . |
| 1394919 | 5/1975 | United Kingdom . |
| 2104551 | 3/1983 | United Kingdom ................... 419/5 |
| 502133 | 4/1976 | U.S.S.R. . |

OTHER PUBLICATIONS

American Society for Metals; vol. 3, Ed. 9, U.S., Ohio, 1980, "Properties and Selections: Stainless Steels, Tool Materials and Special Purpose Metals".
European Search Report EP 85 30 0976—3 pages, Patent Abstract of Japan, vol. 8, No. 220 (M-330).

Primary Examiner—John F. Terapane
Assistant Examiner—Eric Jorgensen
Attorney, Agent, or Firm—Parkhurst & Oliff

[57] ABSTRACT

A metal-ceramic composite article produced by fitting a projection formed on a ceramic member into a hole formed in a metallic member having a hardened region and an unhardened region on its surface such that the ceramic member is monolithically bonded to the metallic member and the deformed region of the metallic member resulting from the fitting is located within its unhardened range, has a high bonding force between the ceramic member and the metallic member and is adapted to be used in engine parts, such as turbocharger rotor, gas turbine rotor and the like, and other structural parts exposed to high temperature or to repeating loads, by utilizing the heat resistance, wear resistance and high strength of the ceramic.

16 Claims, 3 Drawing Figures

METAL-CERAMIC COMPOSITE ARTICLE AND A METHOD OF PRODUCING THE SAME

RELATED APPLICATIONS

This application is related to co-pending application Ser. No. 700,102, filed Feb. 11, 1985.

BACKGROUND OF THE INVENTION (1) Field of the Invention

The present invention relates to a metal-ceramic composite article and a method of producing the same, and more particularly relates to a metal-ceramic composite article comprising a metal and a ceramic bonded with each other by fitting, and a method of producing the same.

(2) Description of the Prior Art

Ceramics are hard and excellent in wear resistance, and further are excellent in mechanical strength and corrosion resistance at high temperatures. Therefore, ceramics can be used as structural material for a gas turbine rotor and turbocharger rotor, which are required to have high mechanical strength and wear resistance at high temperatures, and it has been investigated to use ceramics in gas turbine rotors and turchocharger rotors. For example, U.S. Pat. No. 4,396,445 discloses a turbine rotor whose blade and shaft are made of ceramics. In the turbine rotor of this structure, a threaded portion is formed at one end of the ceramic shaft, and a metallic impeller of a compressor is fixed thereto. However, the turbine rotor of this structure has a drawback that the threaded portion of the ceramic shaft is broken during the use of the turbine rotor due to the difference of the coefficients of thermal expansion between the metallic material which constitutes the impeller of the compressor, and the ceramic material which constitutes the shaft of the turbine rotor. Moreover, a high precision technique, requiring a long amount of time and a high cost are required for forming threads in the ceramic shaft. In order to overcome these drawbacks, Japanese Utility Model Application Laid-open Specification No. 92,097/82 discloses a turbine rotor having a structure, wherein its ceramic shaft is fitted into a hollow cylindrical portion formed at the end of its metallic shaft. However, this structure has a drawback that, when a ceramic shaft is fitted into a metallic hollow cylinder, whose outer surface has previously been hardened in order to improve the wear resistance of the contacting portion of the metallic shaft surface with a bearing, cracks are formed in the hardened surface portion. Further, when a hardening treatment, such as nitriding or the like, is carried out on the surface of a metallic shaft after the ceramic shaft has been fitted into the metallic shaft, the tightness of the fitted portion is decreased or the ceramic shaft is separated from the metallic shaft. Furthermore, when a ceramic shaft is fitted into a metallic shaft, and then the metallic shaft is subjected to a quenching treatment, the ceramic shaft is separated from the metallic shaft due to the phase transformation of the metallic shaft caused by the quenching. Therefore, in the above described structure, the wear resistance of the contacting portion of the metallic shaft surface with a bearing is poor, and the structure cannot be practically available.

SUMMARY OF THE INVENTION

The object of the present invention is to provide a metal-ceramic composite article comprising a metallic member and a ceramic member bonded to each other in high bonding strength, which metallic member has a high wear resistance in a predetermined portion.

The first aspect of the present invention lies in a metal-ceramic composite article comprising a metallic member having a hole formed therein and having a hardened region and an unhardened region on its surface, and a ceramic member having a projection, the projection of the ceramic member having been fitted into the hole of the metallic member to bond monolithically the ceramic member to the metallic member, and a deformed region of the metallic member, due to the fitting, being located within its unhardened region; and further lies in a method of producing the metal-ceramic composite article, comprising subjecting a portion of the surface of a metallic member to a hardening treatment to form a hardened region on a portion of the surface, forming a hole in the metallic member, fitting a projection formed on a ceramic member into the hole of the metallic member such that the ceramic member is monolithically bonded to the metallic member and the deformed region of the metallic member, due to the fitting, is located within its unhardened region.

The inventors have further investigated and found that the use of a metallic member having a hardened region and an unhardened region having a hardness of Hv 250–450 on its surface can produce a metal-ceramic composite article having a high bonding strength between the metallic member and the ceramic member even in the case where the wall thickness forming the hole of the metallic member is small.

That is, the second aspect of the present invention lies in that a metallic member having a hardened region and an unhardened region having a hardness of Hv 250–450 is used as the metallic member of the metal-ceramic composite article of the present invention.

DESCRIPTION OF THE PREFERRED EMBODIMENT

Figure 1:
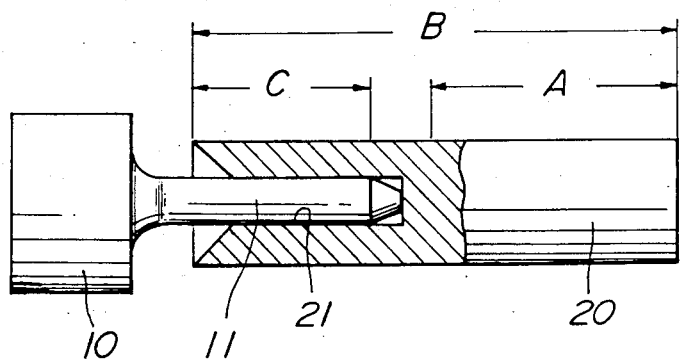
FIG. 1 is a longitudinal view, partly in section of a metal-ceramic composite article of the present invention.

The metal-ceramic composite article of the present invention comprises, as illustrated in FIG. 1, a metallic member 20 having a hole 21 and a ceramic member 10 having a projection 11, the projection of the ceramic member having been fitted into the hole of the metallic member.

In the first aspect of the present invention, a projection formed on a ceramic member is fitted into a hole formed in a metallic member having a hardened region on a portion of its surface to bond the metallic member to the ceramic member. The hardening treatment for hardening the surface of the metallic member constituting the metal-ceramic composite article of the present invention is carried out on that portion of the metallic member surface which is worn by friction or sliding of other machine parts against the metallic member during the use of the composite article. By this surface-hardening treatment, a hardened layer is formed on the surface of the metallic member, and the wear resistance of the predetermined portion of the metallic member in the resulting metal-ceramic composite article of the present invention is improved. As the method of the above described surface-hardening treatment, there can be used carburizing, nitriding, surface quenching, discharge hardening and the like. Among these hardening treatments, carburizing, nitriding and surface quenching are preferable, because they can form a hardened surface layer having a large thickness. Moreover, among various nitriding methods, the ion nitriding method is particularly preferable due to the reason that the area of the surface to be hardened and the depth to be hardened can be easily controlled by the ion nitriding method.

In the bonding of a ceramic member to a metallic member by fitting the projection of the ceramic member into the hole of the metallic member, the metallic member is deformed at the fitted portion in proportion to the dimensional difference between the projection and the hole. However, the above described hardened surface layer of the metallic member is brittle and can not be plastically deformed. Therefore, when the hardened surface layer of the metallic member is plastically deformed by the fitting, cracks are formed on the hardened surface layer. In order to obviate this drawback, the metal-ceramic composite article of the present invention is made into such a structure that the deformation of the metallic member by fitting occurs in the unhardened region of the metallic member. That is, the surface of a metallic member is hardened so as to form a hardened surface region on the metallic member, which region is distant by at least a predetermined distance from the portion to be deformed of the metallic member by fitting. The predetermined distance is determined depending upon the accuracy in the working of the ceramic and metallic members, the fitting method of both the members, the amount of the metallic member to be deformed, and the shape and dimension of both the members, so as not to cause cracks and other flaws in the hardened surface portion of the metallic member in the case where the metallic member is deformed by fitting.

For example, when a projection of 7.0 mm diameter formed on a ceramic member is fitted into a hole of 6.8 mm inner diameter formed in a metallic member having a diameter of 9.3 mm, a distance between the hardened surface region and the portion to be deformed in a metallic member is preferably at least 1 mm, and particularly preferably at least 2 mm. When at least 2 mm of this distance is present, a particularly high accuracy is not required in the working of both the members at the portions to be fitted and in the determination of the position of the region to be hardened on the surface of the metallic member, and therefore the presence of at least 2 mm of this distance is particularly preferable. However, when the distance is less than 1 mm, it is necessary to work particularly accurately both the members at the portions to be fitted, and further to determine the position of the region to be hardened on the surface of the metallic member with a particularly high accuracy, and therefore the presence of less than 1 mm of the distance is not satisfactory for attaining the object of the present invention. The upper limit of the above described distance can be properly selected by taking into consideration the position of the portion, which is required to have a wear resistance, on the metallic member surface and the position of the portion to be deformed of the metallic member due to fitting. In this case, the position and area of the portion to be hardened of the metallic member surface are determined such that the position is the same with the position of the portion which is required to have a wear resistance, and the area is equal to or larger than the area which is required to have a wear resistance. As a result, a metal-ceramic composite article having a high hardness in the predetermined surface portion of the metallic member and having no defects in the fitted portion can be obtained.

In the fitting of the ceramic member to the metallic member constituting the metal-ceramic composite article of the present invention, any interference fit and press fit can be used. In the interference fit, the diameter of a projection formed on a ceramic member is worked into a diameter larger than the inner diameter of the hole formed in a metallic member, and one of the ceramic and metallic members to be fitted is heated or cooled to cause a dimensional difference between the members sufficiently large enough to fit together the members, and the members are fitted to each other by utilizing the dimensional difference. Therefore, the interference fit is suitable in the fitting of a ceramic member and a metallic member having a large dimension in the fitting portion. Further, metal generally has a coefficient of thermal expansion higher than that of ceramics, and therefore the heating of a metallic member can cause a dimensional difference, greater than that caused by the cooling of a ceramic member, and an interference fit wherein a metallic member is heated, can be more stable than the interference fit wherein the ceramic member is cooled. Therefore, the interference fit resulting from heating a metallic member is superior to the interference fit resulting from cooling a ceramic member. The interference in this interference fit is made into such a dimension that the hole of the metallic member and the projection of the ceramic member are not broken after the fitting and further a high tightness required for the fitted portion under the use condition of the metal-ceramic composite article of the present invention can be obtained.

The press fitting is a method, wherein a projection formed on a ceramic member is forcedly pressed and fitted under a load into a hole formed in metallic member, the metallic member having an inner diameter smaller than the diameter of the above described projection. The dimensional difference between the diameter of the projection and the inner diameter of the hole is mainly absorbed by the elastic deformation and plastic deformation of the metallic member, and therefore it is not necessary to limit so strictly the finishing dimensional difference before press fitting between the diameter of the projection and the inner diameter of the hole as strictly limited in the interference fit. Therefore, press fitting is more preferable than the interference fit as a method for fitting together ceramic and metallic members having a small dimension in the fitting portion. The shape and dimension of the hole formed in the metallic member and those of the projection formed on the ceramic member are made into such shape and dimension that are not broken due to the load acting on the hole and projection during press fitting. Further, the dimensional difference between the diameter of the projection and the inner diameter of the hole is made into such a value that the press fitted portion has a tightness sufficiently high enough to endure the use condition of the metal-ceramic composite article of the present invention, and further that both the projection and the hole are not broken during press fitting. Accordingly, the diameter of the projection formed on the ceramic member is preferred to be 1-10%, particularly preferred to be 1-5%, larger than the inner diameter of the hole formed in the metallic member depending upon the hardness of the unhardened region of the metallic member. When this dimensional difference is less than 1%, the tightness in the press-fitted portion is poor, and the projection of the ceramic member is often separated from the hole of the metallic member at the press-fitted portion during use of the metal-ceramic composite article. When the dimensional difference is more than 10%, a high load is required for the press fitting, and the projection of the ceramic member or the hole of the metallic member is broken during press fitting. Therefore, the dimensional difference of less than 1% or more than 10% is not preferable. Further, a stable bonding strength can be obtained by selecting the dimensional difference such that the difference is made into a large value in the use of a metallic member having a low hardness in its unhardened region, or the difference is made into a small value in the use of a metallic member having a high hardness in its unhardened region. This press fitting may be effected at room temperature or by heating the metallic member or both the metallic member and the ceramic member. However, a method wherein both the members are heated and press fitted, is most preferable. Because, when both the members are heated, the deformation resistance of the metallic member is decreased and a press fitting can be effected under a low load, and therefore both the members do not break during the press fitting, and further the tightness between both of the members is increased due to the difference in the coefficient of thermal expansion between both the members during the cooling from the press-fitting temperature. When both the members are heated and press fitted, the press-fitting temperature is preferably not higher than the temperature, which is a lower temperature between the annealing temperature of the metallic member and the softening temperature of the hardened surface layer thereof, but not lower than the use temperature of the press-fitted portion. When the press-fitting temperature is higher than the annealing temperature of the metallic member, the internal stress developed in the metallic member by the press fitting is relaxed, and the tightness in the press-fitted portion is decreased. When the press-fitting temperature is higher than the softening temperature of the hardened surface layer, the effect of the surface-hardening treatment decreases. When the press-fitting temperature is lower than the use temperature of the press-fitted portion, if the temperature of the press-fitted portion rises up to the use temperature of the portion, the metallic member slacks at the press-fitted portion and decreases its tightness due to the fact that the metallic member generally has a coefficient of thermal expansion larger than that of the ceramic member. Therefore, a press-fitting temperature higher than the annealing temperature of metallic member, higher than the softening temperature of the hardened surface layer of the metallic member, or lower than the use temperature of the press-fitted portion should not be used.

The second aspect of the present invention will be explained hereinafter.

In the second aspect of the present invention, a ceramic member is bonded to a metallic member by a method, wherein a metallic member is heat treated to adjust its hardness to Hv 250-450, a portion of the surface of the metallic member is subjected to a hardening treatment to form a hardened surface region on part of the surface, a hole is formed in the metallic member, a projection formed on the ceramic member is fitted into the hole of the metallic member. In this case, when the unhardened region of the metallic member constituting the metal-ceramic composite article of the present invention has a hardness lower than Hv 250, if the wall thickness forming the hole of the metallic member is small, the tightness in the fitted portion is poor. While, when the unhardened region has a hardness higher than Hv 450, the metallic member is easily broken by the fitting. Therefore, it is not preferable to use a metallic member having a hardness lower than Hv 250 or higher than Hv 450 in its unhardened region.

The hardening treatment of the surface of the metallic member constituting the metal-ceramic composite article of the present invention is carried out on that portion of the metallic member which is worn by friction or sliding by other machine parts during the use of the composite article. By this hardening treatment, a hardened layer is formed on the surface of the metallic member, and the wear resistance of the predetermined portion of the metallic member in the resulting metal-ceramic composite article of the present invention is improved. As the method of the above described hardening treatment, there can be used carburizing, nitriding, surface quenching, discharge hardening and the like. Among these hardening treatments, carburizing, nitriding and surface quenching are preferable, because they can form a hardened surface layer having a large thickness. Moreover, among various nitriding methods, the ion nitriding method is particularly preferable due to the reason that the area of the surface to be hardened and the depth to be hardened can be easily controlled by the ion nitriding method.

As the heat treatment for adjusting the hardness of the metallic member to the above described hardness, there is used a quenching and tempering treatment or a precipitation-hardening treatment. This heat treatment can be carried out before or at the same time with the hardening treatment of the surface of the metallic member. When the heat treatment is carried out before the surface-hardening treatment of the metallic member, the tempering temperature is preferably not lower than the surface-hardening treatment temperature. When a metallic member, whose hardness has been adjusted by tempering the member at a temperature lower than the surface-hardening treatment temperature, is subjected to a surface-hardening treatment at a temperature not lower than the tempering temperature, the hardness of the unhardened portion in the interior of the metallic member decreases. When the tempering or the precipitation-hardening treatment is carried out concurrently with the surface-hardening treatment, a quenched metallic member or a solid solution treated metallic member is heated in heating equipment which maintains its inner atmosphere for hardening the surface of the metallic member.

The method and condition for fitting a ceramic member into a metallic member in the second aspect of the present invention are the same as those in the first aspect of the present invention. However, in the second aspect, when both the members are heated and press fitted, the press-fitting temperature is preferably not higher than the temperature, which is the lowest temperature among the tempering temperature of the metallic member, the precipitation-hardening temperature thereof and the softening temperature of the hardened surface layer thereof, but not lower than the use temperature of the press-fitted portion. When the press-fitting temperature is higher than the tempering temperature of the metallic member, the hardness of the unhardened portion of the surface of the metallic member lowers and the tightness in the press-fitted portion decreases. When the press-fitting temperature is higher than the precipitation-hardening treatment temperature, the unhardened portion of the surface of the metallic member softens. When the press-fitting temperature is higher than the softening temperature of the hardened surface layer, the effect of the hardening treatment of the surface decreases. When the press-fitting temperature is lower than the use temperature of the press-fitted portion, if the temperature of the press-fitted portion rises up to the use temperature, the metallic member slacks at the press-fitted portion and decreases its tightness due to the reason that the metallic member generally has a coefficient of thermal expansion larger than that of the ceramic member. Therefore, a press-fitting temperature higher than the tempering temperature of metallic member, higher than the precipitation-hardening treatment temperature, higher than the softening temperature of the hardened surface layer of the metallic member, or lower than the use temperature of the press-fitted portion should not be used.

In general, the hardness of the unhardened region obtained by quenching, tempering or precipitation-hardening of a metallic member, is higher than that of the unhardened region obtained by the annealing of the metallic member. Therefore, according to the second aspect of the present invention, a metal-ceramic composite article comprising a metallic member and a ceramic member bonded to each other in a bonding force higher than that in the composite article in the first aspect of the present invention can be obtained.

The metal-ceramic composite article of the present invention produced by fitting a ceramic member into a metallic member is generally subjected to a finishing working and then used. Therefore, a metal portion, which is required to have a wear resistance during the use of the metal-ceramic composite article, must have a predetermined hardness in its surface even after the surface has been ground during the finishing working. However, the hardness of a metallic member surface and the variation of the hardness in a metallic member from its surface to its interior are variously changed depending upon the kind of metal constituting the metallic member and the method and condition for hardening the surface of the metallic member. Therefore, the amount of the metallic member surface to be ground during the finishing working at the portion required to have a wear resistance during the use of the metal-ceramic composite article, is determined depending upon the predetermined hardness of the metallic member surface, the kind of metal constituting the metallic member, and the method and condition for hardening the metallic member surface. Alternatively, the kind of metal constituting a metallic member, and the method and condition for hardening a metallic member surface are determined depending upon the amount to be ground in the finishing working and the surface hardness of the above described metallic member surface.

As the metal constituting the metal-ceramic composite article of the present invention, there are used commercially available metals, whose surface can be hardened by carburizing, nitriding, surface quenching, discharge hardening, metal plating and the like. For example, when the surface hardening is carried out by nitriding, there are preferably used iron alloys containing chromium, such as stainless steel, alloy tool steel, nickel-chromium-molybdenum steel, chromium-molybdenum steel, aluminum-chromium-molybdenum steel and the like; and titanium, zirconium and alloys containing these elements. When the surface hardening is carried out by the ion nitriding, aluminium-chromium-molybdenum steel and stainless steel are preferably used due to the reason that these alloy steels, after iron nitrided, have a high surface hardness and further have a high hardness from the surface to a deep portion; and particularly aluminum-chromium-molybdenum steel is inexpensive and is most preferable.

The ceramic constituting the metal-ceramic composite article of the present invention is selected from the group consisting of silicon nitride, silicon carbide, zirconia, alumina, beryllia, sialon and the like, depending upon the intended use for the metal-ceramic composite article. For example, when a turbocharger rotor or a gas turbine rotor is produced from the metal-ceramic composite article of the present invention, it is preferable to use silicon nitride and silicon carbide, which have excellent high-temperature strength and thermal shock resistance and have a low specific gravity, for the turbine wheel portion which is exposed to exhaust gas having a high temperature and for the rotary shaft which is connected to the turbine wheel.

Figure 2:
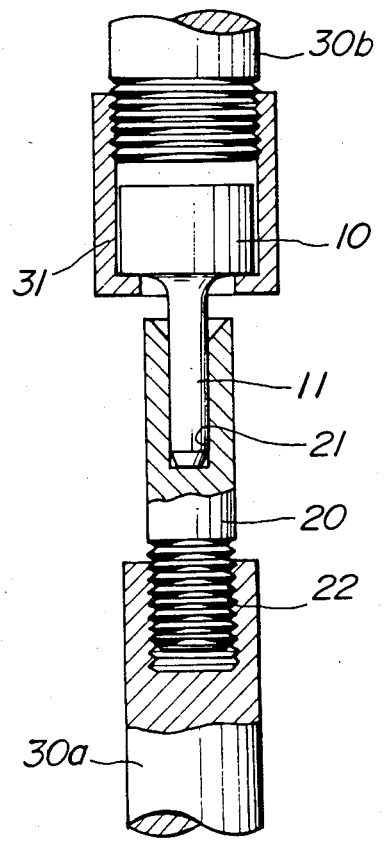
FIG. 2 is an explanative view, partly in section, illustrating a method for a pulling test of the metal-ceramic composite article of the present invention.

The present invention will be explained in more detail with reference to the following examples and FIGS. 1–3.

EXAMPLE 1

A silicon nitride round rod produced by a pressureless sintering method (hereinafter, silicon nitride produced by a pressureless sintering method is merely referred to as silicon nitride) was worked into a ceramic member 10 having a projection 11 having a diameter of 7.0 mm and a length of 25 mm and having a shape illustrated in FIG. 1. An annealed aluminum-chromium-molybdenum steel (JIS-SACM 645, hereinafter, referred to as nitriding steel) round rod having a diameter of 9.3 mm was worked into a metallic member 20 having at one end a hole 21 having an inner diameter of 6.8 mm and a depth of 15 mm, which had a shape illustrated in FIG. 1. Then, the metallic member was covered with a mild steel cover in a region ranging from its end surface having the inlet of the hole to a position 17 mm distant from the end surface, and the remaining portion (region A in FIG. 1) of the outer surface of the metallic member was subjected to an ion nitriding treatment at 550° C. for 20 hours in a mixed atmosphere consisting of equal amounts of nitrogen and hydrogen and kept under a pressure of 4 torr (the thus treated metallic member was referred to as metallic member A). Separately, the total area of the outer surface (region B in FIG. 1) of the above described metallic member was subjected to an ion nitriding treatment under the same condition as that in metallic member A (the thus treated metallic member was referred to as metallic member B).

By the ion nitriding treatment under the above described condition, the Vickers hardness of the nitrided surface portion of the nitriding steel was increased from the original hardness of Hv(0.1) 200 to Hv(0.1) 1,100. Further, the metallic member had a Vickers hardness of Hv(0.1) 700 at a position in a depth of 0.2 mm from its surface.

The projection 11 of the ceramic member 10 was press fitted at 350° C. into the hole 21 of each of the above described two kinds of metallic members 20 to produce metal-ceramic composite articles having a shape illustrated in FIG. 1. Due to this press fitting, the metallic member was deformed in its region (region C in FIG. 1) ranging from its end surface having the inlet of the hole to a position 13 mm distant from the end surface, and the diameter of the metallic member in this region was increased by about 0.2 mm. When the outer surface of the deformed portion of the metallic member due to this press fitting was examined, there was no extraordinary change in the metal-ceramic composite article produced by using metallic member A. However, in the metal-ceramic composite article produced by using metallic member B, a large number of cracks having a length of about 10 mm and a depth of about 0.5 mm were observed along the axial direction of the metallic member.

As described above, when the hardened surface portion of a metallic member is deformed by press fitting, cracks are formed on the metallic member surface, and a satisfactory metal-ceramic composite article can not be obtained. On the contrary, in the metal-ceramic composite article of the present invention, which has been produced by using metallic member A having a surface, which has not been hardened at the portion to be deformed by press fitting, cracks are not formed on the metallic member surface even in the case where the metallic member is deformed by press fitting.

EXAMPLE 2

A ceramic member and metallic member having the same shapes at those used in Example 1 were produced from the same starting materials as those used in Example 1. The metallic member was covered with a mild steel cover on its outer surface in a region ranging from its end surface having the inlet of the hole formed therein to a position 13.5 mm (in metallic member C), 14.5 mm (in metallic member D) or 15.5 mm (in metallic member E) distant from the end surface, and the remaining region of the outer surface of the metallic member was subjected to an ion nitriding treatment under the same condition as described in Example 1 to produce three kinds of metallic members C, D and E. Into the hole of each of these three kinds of metallic members was press fitted at 350° C. the projection of the ceramic member to produce metal-ceramic composite articles illustrated in FIG. 1. By this press fitting, each of the metallic members was deformed in the region ranging from its end surface having the inlet of the hole to a position 13 mm distant from the end surface, and the outer diameter of the metallic member was increased in this region. When the deformed portion of the metallic member due to the press fitting, and the outer surface of the metallic member in the vicinity of the deformed portion were examined, no cracks were observed on the outer surface of metallic member D and E, but a crack having a length of about 2 mm and a depth of about 0.2 mm was observed in metallic member C along its axial direction in the vicinity of the boundary between the ion nitrided portion and the unnitrided portion. That is, in the metal-ceramic composite article of the present invention, wherein the region to be deformed by press fitting in a metallic member, and the hardened surface region of the metallic member are distant from each other by more than a predetermined distance, cracks are not formed on the metallic member surface even when the metallic member is deformed due to press fitting.

EXAMPLE 3

A silicon nitride round rod was worked into a ceramic member 10 having a shape illustrated in FIG. 1, which had a projection 11 having a diameter shown in the following Table 1 and having a length of 25 mm. Separately, an annealed nitriding steel round rod was worked into a round rod-shaped test piece having a diameter of 9.3 mm and a length of 80 mm, and the test piece was covered with a mild steel cover in a region ranging from its one end to a position 17 mm distant from the end, and the remaining portion of the surface of the test piece was hardened by the ion nitriding treatment under the same condition as described in Example 1. Then the test piece was worked into a metallic member 20 having a shape illustrated in FIG. 1, which had a hole 21 at the end in the unhardened side of the test piece, said hole 21 having a diameter shown in Table 1 and a depth of 15 mm. Into the hole 21 of this metallic member 20 was fitted at 350° C. the above described projection 11 of the ceramic member 10 to produce a metal-ceramic composite article illustrated in FIG. 1.

Then, the outer diameter of the metallic member 20 of the resulting metal-ceramic composite article was worked into 9.1 mm, and screw threads 22 having a predetermined dimension were formed at the end portion of the metallic member 20. As illustrated in FIG. 2, the ceramic member 10 was held by a clamping device 31, which had been threadedly engaged with one rod 30b of pull rods for the pulling test and the screw threads 22 were threadedly engaged with another pull rod 30a for the pulling test. Then, the metal-ceramic composite article held by the pull rods, as illustrated in FIG. 2, was placed in a heating furnace and heated up to 350° C., and the ceramic member 10 and metallic member 20 were pulled in up and down directions while keeping the press-fitted portion at 350° C., and a load required for separating the ceramic member from the metallic member at the press-fitted portion was measured. The obtained results are shown in Table 1.

In Table 1, sample Nos. 1-6 are metal-ceramic composite articles, wherein the dimensional difference between the diameter of the projection formed on a ceramic member and the inner diameter of the hole formed in a metallic member is within the range defined in the present invention, and sample Nos. 101-103 are the composite articles, wherein the dimensional difference is outside the range defined in the present invention. It can be seen from Table 1 that, in a metal-ceramic composite article wherein the above described dimensional difference is within the range defined in the present invention, a high load is required for separating the ceramic member from the metallic member at 350° C. On the contrary, in a metal-ceramic composite article wherein the above described dimensional difference is smaller than the lower limit of the difference defined in the present invention, the load required for the separation is low. Further, in a metal-ceramic composite article (sample No. 103) wherein the dimensional difference is larger than the upper limit of the difference defined in the present invention, the projecton of the ceramic member is broken during the press fitting of the projection into the hole of the metallic member even though the metallic member of sample No. 103 has the same wall thickness forming a hole of the metallic member as the wall thickness forming a hole of the metallic members of other samples before press fitting.

following Table 2, through quenching and tempering, was worked into a round rod-shaped test piece having a diameter of 9.3 mm and a length of 80 mm. A hole 21 having an inner diameter of 7.75 mm and a depth of 15

TABLE 1

| | Sample No. | Diameter of a projection formed on ceramic member (mm) | Inner diameter of a hole formed in metallic member (mm) | Dimensional difference (%) | Wall thickness forming a hole of metallic member before press fitting (mm) | Press-fitting temperature (°C.) | Load for Press fitting | separation kg |
|---|---|---|---|---|---|---|---|---|
| Composite article of this invention | 1 | 6.9 | 6.8 | 1.5 | 1.25 | 350 | Y | 130 |
| | 2 | 7.0 | 6.8 | 2.9 | 1.25 | 350 | Y | 270 |
| | 3 | 7.1 | 6.8 | 4.4 | 1.25 | 350 | Y | 280 |
| | 4 | 7.2 | 6.8 | 5.9 | 1.25 | 350 | Y | 283 |
| | 5 | 7.3 | 6.8 | 7.4 | 1.25 | 350 | Y | 280 |
| | 6 | 7.4 | 6.8 | 8.8 | 1.25 | 350 | Y | 280 |
| Comparative composite article | 101 | 6.84 | 6.8 | 0.6 | 1.25 | 350 | Y | 20 |
| | 102 | 6.86 | 6.8 | 0.9 | 1.25 | 350 | Y | 40 |
| | 103 | 7.5 | 6.8 | 10.3 | 1.25 | 350 | N | — |

Y: press fitting is possible
N: press fitting is impossible

EXAMPLE 4

A ceramic member 40 having a total length of 60 mm, which had a monolithic structure consisting of a turbine wheel 41 having a diameter of 61 mm and a turbine shaft 42 having a diameter of 9.1 mm, was produced from silicon nitride. The tip of the turbine shaft of the ceramic member was worked into a projection 43 having a diameter of 6 mm and a length of 13 mm. Separately, a nitriding steel round rod having a total length of 70 mm and a diameter of 9.1 mm was produced, and covered with a mild steel cover in a region ranging from one end of the round rod to a position 13 mm distant from the end, and the remaining portion of the surface of the rod was hardened by an ion nitriding treatment under the same condition as described in Example 1. Then, a hole 52 having an inner diameter of 5.8 mm and a depth of 12 mm was formed at the end in the unhardened portion side of the round rod to produce a metallic member 50. Into this hole 52 was press fitted the projection 43 formed at the tip of the above described turbine shaft at 350° C., which is not lower than the use temperature of the fitted portion, to bond monolithically the ceramic member 40 with the metallic member 50. Then, the diameters of the ceramic turbine shaft 42 and the metallic tubine shaft 51 of the resulting assembly were worked into 9.0 mm, and and the diameter of the rotary shaft 53 in the compressor wheel side of the assembly was worked into 5 mm to produce a turbocharger rotor having a shape illustrated in FIG. 3, wherein its turbine wheel and a part of its turbine shaft were made of silicon nitride, and the remaining portion of its turbine shaft was made of nitriding steel. When this turbocharger rotor was placed in a high-temperature rotary tester and a rotation test was effected at a rate of 150,000 rpm for 1 hour by a combustion gas, no extraordinary change was observed in the fitted portion of the ceramic and metallic members, and in the bearing contacting surface 54 of the metallic turbine shaft.

EXAMPLE 5

A silicon nitirde round rod was worked into a ceramic member 10 having a shape illustrated in FIG. 1, which had a projection 11 having a diameter of 7.90 mm and a length of 25 mm. Separately, a nitriding steel round rod, whose hardness had previously been adjusted to a hardness shown in sample Nos. 7-11 in the following Table 2, through quenching and tempering, was worked into a round rod-shaped test piece having a diameter of 9.3 mm and a length of 80 mm. A hole 21 having an inner diameter of 7.75 mm and a depth of 15 mm was formed at one end of the test piece to produce a metallic member 20 having a shape illustrated in FIG. 1. Another nitriding steel round rod, whose hardness had previously been adjusted to Hv 300 through a quenching followed by a tempering at 680° C., was worked into a round rod-shaped test piece having a diameter of 9.3 mm and a length of 80 mm, and the test piece was covered with a mild steel cover in a region ranging from its one end to a position 15 mm distant from the end, and the remaining portion of the surface of the test piece was hardened by the ion nitriding treatment under the same condition as described in Example 1. By the above described treatment, a test piece having a hardness of Hv 1,100 in the nitrided surface portion and a hardness of Hv 300 in the un-nitrided surface portion was obtained. The hardness of the un-nitrided surface portion of the test piece was not changed even in the heat treatment for the nitriding. Then, a hole 21 having an inner diameter shown in sample Nos. 12-16 in Table 2 and a depth of 15 mm was formed at one end in the unhardened side of the test piece to produce a metallic member 20 having a shape illustrated in FIG. 1.

Into the hole 21 of each of the metallic member 20 was press fitted at 350° C. the projection 11 of the ceramic member 10 to produce a metal-ceramic composite article. By this press fitting, the metallic member was deformed over a range ranging from its end surface having the inlet of the hole to a position 13 mm distant from the end surface.

The pulling test of the resulting metal-ceramic composite article was carried out in the same manner as described in Example 3. The obtained results are shown in Table 2.

In Table 2, sample Nos. 7-11 are metal-ceramic composite articles, wherein the hardness of the unhardened region of metallic member is within the range defined in the second aspect of the present invention; sample Nos. 12-16 are metal-ceramic composite articles, wherein the dimensional difference between the diameter of the projection of the ceramic member and the inner diameter of the hole of the metallic member is within the range defined in the present invention; sample Nos. 104 and 105 are metal-ceramic composite articles, wherein the hardness of the unhardened region of the metallic member is outside the range defined in the second aspect of the present invention; and sample Nos. 106 and 107 are metal-ceramic composite articles, wherein the above described dimensional difference is outside the range defined in the present invention.

turbine shaft were made of silicon nitride, and the remaining portion of its turbine shaft was made of nitrid-

TABLE 2

| | Sample No. | Diameter of a projection formed on ceramic member (mm) | Inner diameter of a hole formed in metallic member (mm) | Dimensional difference (%) | Wall thickness forming a hole of metallic member after finishing work (mm) | Hardness of metallic member (Hv) | Press-fitting temperature (° C.) | Press fitting | Load for separation (kg) |
|---|---|---|---|---|---|---|---|---|---|
| Composite article of this invention | 7 | 7.90 | 7.75 | 1.9 | 0.6 | 260 | 350 | Y | 103 |
| | 8 | 7.90 | 7.75 | 1.9 | 0.6 | 300 | 350 | Y | 200 |
| | 9 | 7.90 | 7.75 | 1.9 | 0.6 | 350 | 350 | Y | 320 |
| | 10 | 7.90 | 7.75 | 1.9 | 0.6 | 400 | 350 | Y | 480 |
| | 11 | 7.90 | 7.75 | 1.9 | 0.6 | 450 | 350 | Y | 650 |
| | 12 | 7.90 | 7.75 | 1.9 | 0.6 | 300 | 350 | Y | 200 |
| | 13 | 7.90 | 7.61 | 3.8 | 0.6 | 300 | 350 | Y | 330 |
| | 14 | 7.90 | 7.42 | 6.4 | 0.6 | 300 | 350 | Y | 540 |
| | 15 | 7.90 | 7.34 | 7.7 | 0.6 | 300 | 350 | Y | 620 |
| | 16 | 7.90 | 7.25 | 9.0 | 0.6 | 300 | 350 | Y | 680 |
| Comparative composite article | 104 | 7.90 | 7.75 | 1.9 | 0.6 | 220 | 350 | Y | 65 |
| | 105 | 7.90 | 7.75 | 1.9 | 0.6 | 480 | 350 | N | — |
| | 106 | 7.90 | 7.83 | 0.9 | 0.6 | 300 | 350 | Y | 80 |
| | 107 | 7.90 | 7.15 | 10.5 | 0.6 | 300 | 350 | N | — |

Y: press fitting is possible
N: press fitting is impossible

It is shown in Table 2 that, in the metal-ceramic composite articles, wherein the hardness of the unhardened region of the metallic member is within the range defined in the second aspect of the present invention, and the dimensional difference between the inner diameter of the hole of the metallic member and the diameter of the projection of the ceramic member is within the range defined in the present invention, a very high load is required for the separation of the ceramic member from the metallic member at 350° C. This load required for the separation increases corresponding to the lowering of the pulling temperature, and therefore a load higher than the load described in Table 2 is required for the separation when the temperature of the fitted portion is lower than 350° C. On the contrary, when the hardness of the unhardened region of the metallic member is lower than the lower limit of the hardness defined in the second aspect of the present invention, or when the hardness is higher than the upper limit of the hardness defined in the second aspect of the present invention, the hole of the metallic member is broken during press fitting. Similarly, when the dimensional difference between the inner diameter of the hole formed in the metallic member and the diameter of the projection formed on the ceramic member is smaller than the lower limit of the dimensional difference defined in the present invention, the load required for the separation is low; and when the dimensional difference is larger than the upper limit of the dimensional difference defined in the present invention, the hole of the metallic member or the projection of the ceramic member are broken during press-fitting.

Further, Table 2 illustrates the following fact. In the first aspect of the present invention, the hardness of the unhardened region of the metallic member is not defined. However, when the unhardened region of the metallic member has an extremely low hardness of Hv 220 (sample No. 104) or an extremely high hardness of Hv 480 (sample No. 105), the object of the present invention can not be attained even though the dimensional difference is within the range defined in the present invention.

EXAMPLE 6

Figure 3:
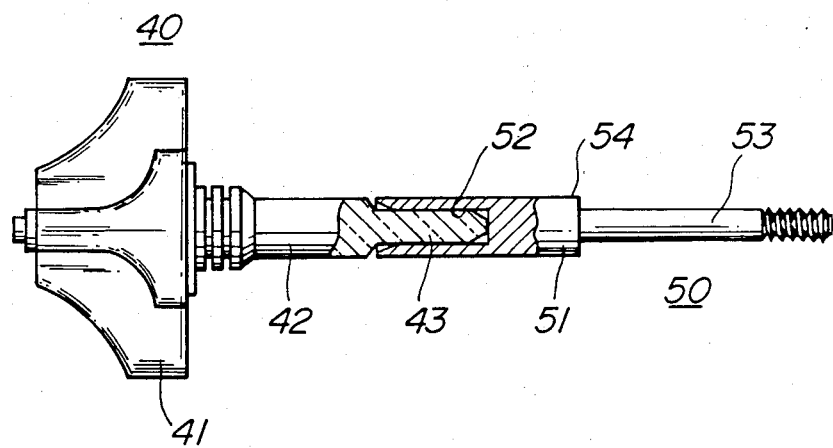
FIG. 3 is an explanative view, partly in section, illustrating a press-fitted portion of a ceramic member into a metallic member in a turbocharger rotor in a practical application of the metal-ceramic composite article of the present invention.

A turbocharger rotor having a shape illustrated in FIG. 3, wherein its turbine wheel and a portion of its turbine shaft were made of silicon nitride, and the remaining portion of its turbine shaft was made of nitriding steel, was produced in the same manner as described in Example 4, except that a nitriding steel having a hardness previously adjusted to Hv 350 by a heat treatment was used as a metallic member 50, the metallic member had a hole having an inner diameter of 7.7 mm and a depth of 12 mm, and a ceramic member had a projection of 7.9 mm diameter and 13 mm length. When this turbocharger rotor was placed in a high-temperature rotary tester and a rotation test was effected at a rate of 150,000 rpm for 100 hours, no extraordinary change was observed in the fitted portion of the ceramic member and the metallic member, and in the bearing contacting surface 54 of the metallic turbine shaft.

As described above, the metal-ceramic composite article of the present invention is produced by fitting a projection formed on a ceramic member into a hole formed in a metallic member having a hardened surface in the predetermined region, which projection has a diameter 1–10% larger than the inner diameter of the hole, so as to bond monolithically the ceramic member to the metallic member. Therefore, the composite article has a high bonding strength in this fitted portion and has a high wear resistance in its predetermined portion of the metallic member. Accordingly, when a turbocharger rotor is produced by using the metal-ceramic composite article of the present invention such that its turbine wheel and a portion of its turbine shaft consist of silicon nitride and the remaining portion of its turbine shaft consists of nitriding steel, the resulting turbocharger rotor is excellent in responsibility and durability and is high in efficiency.

Further, when a metallic member having a hardness of Hv 250–450 in its unhardened region is used in the production of a metal-ceramic composite article of the present invention, a high bonding strength can be obtained in the fitted portion of the projection of the ceramic member and the hole of the metallic member even in the case where the wall thickness forming the hole of the metallic member is small, and therefore the diameter of the projection of the ceramic member can be larger, and the strength of the projection increases, and further the reliability of the fitted portion increases.

As described above, the metal-ceramic composite article of the present invention can be used in engine parts, such as turbocharger rotor, gas turbine rotor and the like, and other structural parts exposed to high temperature or to repeating loads, by utilizing the heat resistance, wear resistance and high strength of the ceramic, and further can produce inexpensively these engine parts and structural parts having a high durability.

What is claimed is:

1. A metal-ceramic composite article, comprising a metallic member having a hole formed therein and a ceramic member including a projection, the projection of the ceramic member having been positioned within the hole of the metallic member through fitting, the improvement comprising the metallic member having a hardened region and an unhardened region on its surface, wherein the unhardened region is located on a portion of the metallic member which is deformed due to the fitting of the projection of the ceramic member into the hole of the metallic member.

2. A metal-ceramic composite article according to claim 1, wherein the unhardened region has a hardness of Hv 250–450.

3. A metal-ceramic composite article according to claim 1, wherein the portion of the metallic member which is deformed is located a predetermined distance from the hardened region.

4. A metal-ceramic composite article according to claim 1, wherein the hardened region is formed by an ion nitriding method.

5. A metal-ceramic composite article according to claim 1, wherein the metallic member comprises nitriding steel and the ceramic member comprises silicon nitride.

6. A metal-ceramic composite article according to claim 1, wherein the metallic member comprises one member selected from the group consisting of stainless steel, alloy tool steel, chromium-molybdenum steel and aluminum-chromiun-molybdenum steel, and the ceramic member comprises one member selected from the group consisting of silicon nitride and silicon carbide.

7. A metal-ceramic composite article according to claim 1, wherein the metal-ceramic article comprises a turbocharger rotor.

8. A metal-ceramic composite article according to claim 1, wherein the metallic member is deformed by having an increased outer diameter.

9. A method of producing a metal-ceramic composite article comprising:

forming a hole with an inner diameter in a metallic member;

forming a projection with an outer diameter on a ceramic member; and surface hardening the metallic member at all portions except a portion wherein the inner diameter of the hole is less than the outer diameter of the ceramic member to be fitted therein, thereby forming a hardened surface region and an unhardened surface region and fitting the projection of the ceramic member into the hole of the metallic member, such that an increase in an outer diameter of the metallic member due to the fitting occurs within the unhardened surface region of the metallic member.

10. The method according to claim 9, wherein the metallic member is heat treated to adjust its hardness to Hv 250–450.

11. The method according to claim 10, wherein the heat treatment is a combination of a quenching treatment and a tempering treatment at a temperature of not lower than the surface-hardening temperature.

12. The method according to claim 10, wherein the fitting is a press-fitting operation which occurs at a temperature not greater than a tempering temperature of the metallic member but not lower than a highest use temperature of the fitted portion.

13. The method according to claim 9, wherein the hardening treatment is an ion nitriding treatment.

14. The method according to claim 9, wherein the fitting is a press-fitting operation which occurs at a temperature not greater than a temperature, which is a lower temperature between an annealing temperature of the metallic member and a softening temperature of the hardened surface layer thereof, but not lower than a highest use temperature of the press-fitted portion.

15. The method according to claim 9, wherein the diameter of the projection formed on the ceramic member is larger by 1–10% than the inner diameter of the hole formed in the metallic member.

16. The method according to claim 9, wherein the metallic member is quenched and thereafter heated up to a nitriding treatment temperature in heating equipment which maintains exposure of the metallic member to a nitriding atmosphere, to effect concurrently the surface hardening treatment of the hardened part of the metallic member and a tempering treatment of the metallic member.

* * * * *